United States Patent
Stoner et al.

[11] Patent Number: 6,052,383
[45] Date of Patent: Apr. 18, 2000

[54] LAN TO ATM BACKBONE SWITCH MODULE

[75] Inventors: David Stoner, Sudbury; Carl John Lindeborg, Shrewsbury, both of Mass.; Norm Magnan, Woonsocket, R.I.

[73] Assignee: 3COM Corporation, Santa Clara, Calif.

[21] Appl. No.: 08/865,242

[22] Filed: May 29, 1997

[51] Int. Cl.⁷ .............................. H04T 3/16; H04L 12/28
[52] U.S. Cl. ........................ 370/466; 370/395; 370/469
[58] Field of Search ................................ 370/412, 428,
370/429, 465, 466, 469, 395, 401, 422;
395/285, 831

[56] References Cited

U.S. PATENT DOCUMENTS

| | | | |
|---|---|---|---|
| 5,471,618 | 11/1995 | Isfeld | 395/839 |
| 5,528,590 | 6/1996 | Iidaka et al. | 370/60.1 |
| 5,604,865 | 2/1997 | Letz et al. | 395/200.08 |
| 5,734,656 | 3/1998 | Prince et al. | 370/401 |
| 5,737,525 | 4/1998 | Picazo, Jr. et al. | 395/200.02 |
| 5,761,201 | 6/1998 | Vaudreuil | 370/392 |
| 5,793,976 | 8/1998 | Chen et al. | 395/200.54 |
| 5,805,816 | 9/1998 | Picazo, Jr. et al. | 395/200.53 |
| 5,818,842 | 10/1998 | Burwell et al. | 370/397 |

*Primary Examiner*—Ajit Patel
*Assistant Examiner*—Brian Nguyen
*Attorney, Agent, or Firm*—McGlew, and Tuttle, P.C.

[57] ABSTRACT

A LAN to ATM switch module includes a memory with an ATM port, a LAN port and a processor port. Each of port separately reading and writing information to/from the memory. An ATM interface is included for reading information from the ATM port and converting the information into an ATM format. The ATM interface also converts ATM format information to be delivered to the ATM port and written to the memory. A LAN interface reads information from the LAN port and converts the information into LAN format. The LAN interface also converts LAN information from a LAN packet channel bus to the LAN port, to be written to the memory. The switch module also includes a processor for reading information in the memory through the processor port. The processor determines the processing need for the information, the processor modifies the information in the memory according to the processing needed by writing to the memory through the processor port and controlling the ATM and LAN interfaces according to the processing needed.

20 Claims, 6 Drawing Sheets

LAN TO ATM BACKBONE SWITCH MODULE

FIELD OF THE INVENTION

The present invention relates to Local Area Networks (LAN) and Asynchronous Transfer Mode (ATM) communications, and in particular to a switch module which transfers and converts information between a LAN and an ATM network.

BACKGROUND OF THE INVENTION

A LAN and an ATM transfer information in different formats. A LAN transmits information in a broadcast style, where each workstation on the LAN is theoretically capable of receiving all information. Each individual workstation only accepts information which is designated for that workstation and ignores all other information.

An ATM system or network creates a point-to-point link between two workstations which wish to communicate with each other. This point-to-point link is established for each communication session, and after the communication session is finished, the configuration used to set up the point-to-point link is eliminated.

A conversion is therefore needed between a LAN and an ATM. Information from the LAN which is to be sent to the ATM, requires a translation of LAN data format and processing instructions into ATM data format and processing instructions. Correspondingly, information from the ATM which is to be sent to the LAN, requires a translation of ATM data format and instructions into LAN data format and instructions. These translations can include modifying the header portion of the information for the respective network, and modifying the operation of the respective network.

Packets of information transmitted over a LAN usually have variable packet lengths. In an ATM network, the information is transferred in cells which have a fixed length. Even if each packet in a LAN was set to a fixed length, the fixed length could be different from the cell length. Therefore conversion is necessary to place the information from packets having variable lengths, into cells having fixed lengths.

SUMMARY AND OBJECTS OF THE INVENTION

The present invention converts information between a LAN and an ATM by providing a switch module which is connectable to the LAN and the ATM. Information received by the switch module is stored in a memory. The information then needs to be analyzed to determine the modifications that are needed to be made to the information, and what network or system instructions are needed to properly configure the receiving network to receive the information. The information is also analyzed to determine how to properly respond to the transmitting network to indicate success or failure in establishing communication with the receiving network.

While the information is being analyzed in the switch module, the information is stored in a memory. The memory of the present invention preferably has a plurality of ports. Information between the memory and the LAN is conveyed through a LAN port means, information between ATM and the memory is conveyed through an ATM port means, and information from a processor of the switch module is conveyed between the processor and the memory through a processor port means. Each of the port means separately read and write to the memory. This separate reading and writing allows the LAN to write to the memory without interfering with any information that the processor of the switch module may be reading from another source. If there was only one port on the memory module, the data bus for the, ATM, LAN, and processor means would all have to be connected together to access the memory. Anytime information was written to or read from the memory, the data bus for each of the ATM, LAN and processor would contain that information. By the memory having separate port means, information can be read from or written to the memory without one data bus interfering with another data bus reading or writing data to a different entity.

The processor means reads the information in the memory and determines if, and how, the information needs to be modified for the receiving network. The processor means also determines how the corresponding networks need to be configured to properly convey the information. The processor means then modifies, or rewrites the information in the memory, which can include modifying the header in the portion of the information. The processor means also then configures the respective networks, either directly or through instructions, to properly convey the information.

The processor means preferably includes two separate processors, namely a packet switching processor (PSP) and a management central processor unit (MCPU). The port means of the memory, also preferably contains a packet switching processor (PSP) port means and a management central processor unit (MCPU) port means which also separately read and write to the memory. In this way the packet switching processor can read or write from the memory, without interfering with the management processor reading and writing to another entity.

The Packet Switching Processor (PSP) is responsible for all of the forwarding decisions for packets coming in either the ATM or LAN ports. To do this it must read the packet header to determine its Media Access Control (MAC) destination address, then look up in a table (in the Content Addressable Memory (CAM) or Shared Memory (SM)) to determine how to forward the packet. The PSP must also add or strip the LECID (LAN Emulation Client ID) depending on the destination of the packet. The PSP will strip the LECID if the destination is to the LAN, or add the LECID if the destination is to the ATM. The PSP will also look at the source address in the packet for learning.

The PSP also control the SAR and DMA special process which will perform the actual packet transfer, and in the case of the SAR will perform the translation to/from ATM cells (from LAN packets). The PSP performs the control by setup up packet descriptors which these special processors are able to read. The packet descriptors contain information such as packet location in packet memory and packet size.

The PSP is intended to be a real time processor that must be very fast as the PSP relates directly to performance which is measured in packets per second. Because of this the PSP is given top priority in access to the packet memory.

The Management Central Processor Unit (MCPU) performs a variety of functions that are less time critical. The following functions of the MCPU are:

1. Network management.
2. ATM signaling, i.e. setup direct connections between two end stations. This is required to emulate a broadcast LAN like Ethernet over an ATM network which is connection orientated.
3. LAN Emulation (LANE) functions. As mentioned the ATM network is very different than a broadcast LAN such as Ethernet. The LAN Emulation(LANE) software that is responsible for configuration, address resolution, and broadcast packet transmission.

4. Spanning Tree: For a bridge to operate properly there can not be any loops in the network topology. There may physically be loops in the network, i.e. redundant paths between nodes, but the spanning tree software must detect these loops and block one of them.

The PSP and MCPU perform distinct and separate functions. There are also many functions that are shared between them. For example, when a signaling message comes in the ATM port the PSP detects the receipt of a signaling packet and passes it to the MCPU for it to act on.

The memory of the present invention can include a plurality of memory units so that many individual sets of information can be stored in the switch module. Each set of information can be analyzed and processed individually. The plurality of memory units and ports, also allows for substantially simultaneous two-way traffic through the switch module since the LAN side and ATM side can be configured separately and operate substantially independently. The memory can also store information regarding the status and operation of the ATM and LAN.

Each of the port means of the memory are preferably substantially equal in operational speed, and the word length of each of the ports can vary depending on the entity which the port serves.

When the memory receives simultaneous read or write requests on two or more of its ports, the memory has an arbitration means for giving priority to one of the port means according to a predetermined pattern or logic. The preferable arbitration priority logic gives the packet switching processor first priority. The remaining ports are then given priority in a round robin manner.

By using a four port memory, with separate ports for the LAN, ATM, packet switching processor, and management processor, the present invention is able to perform several tasks substantially simultaneously, and thus quickly process the transfer of information from the LAN to an ATM.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
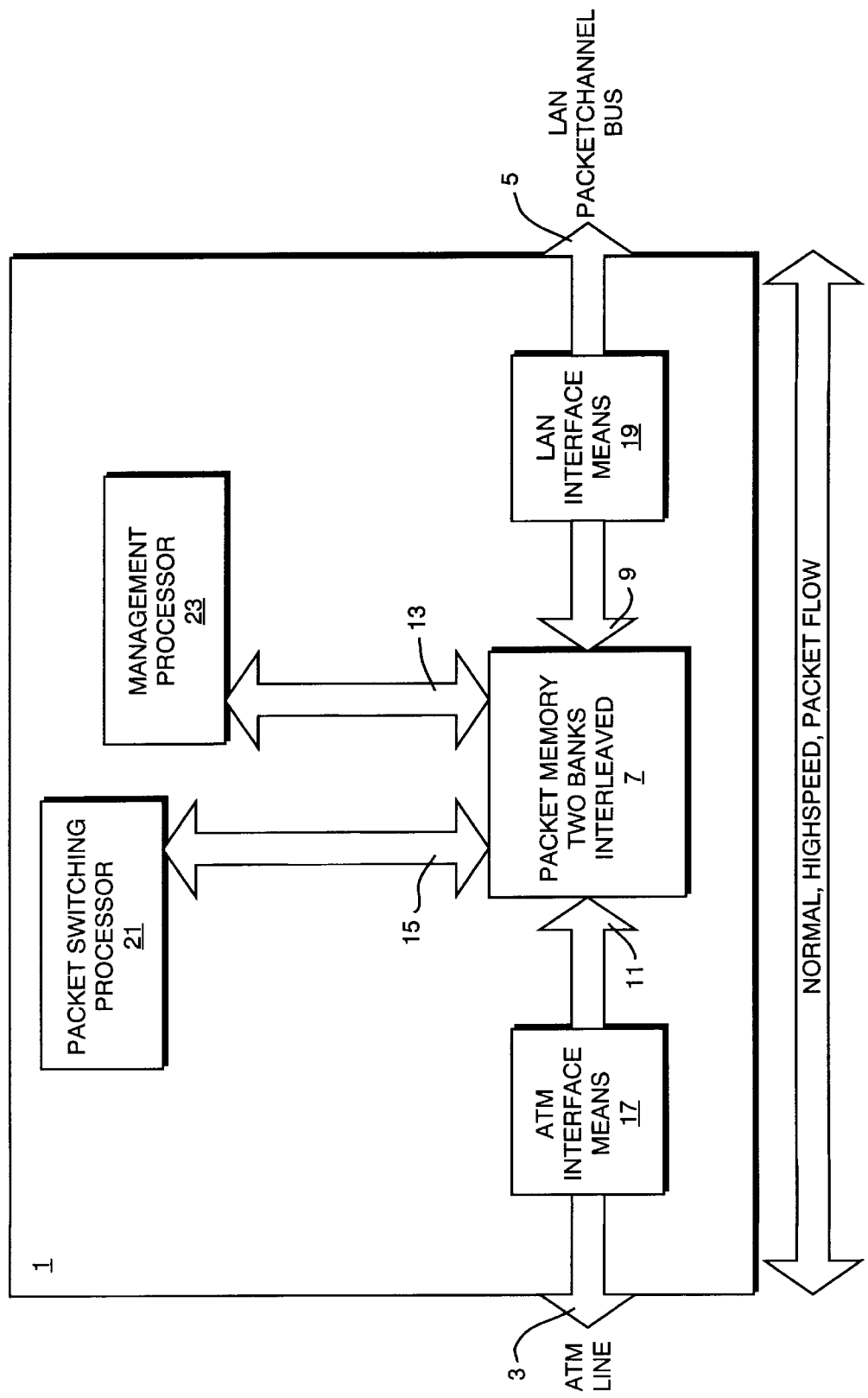
FIG. 1, is a schematic view of the switch module of the present invention with a connection to an ATM line and a LAN packet channel bus.

Referring to the drawings, and in particular to FIG. 1, a switch module 1 has an ATM connector 3 and a packet channel or LAN connector 5. These connectors 3, 5 connect to the ATM line and the packet channel bus respectively. Inside the switch module 1 is a memory means 7. In the preferred embodiment the memory means 7 has four separate and distinct ports, while a memory means of the present invention could have as little as two ports and many more than four ports. One of the ports is a LAN port means 9 which connects to the LAN packet channel bus over the LAN connector 5. The memory means 7 also has an ATM port means 11 which connects to the ATM line through the ATM connector 3. The memory means 7 also includes a PSP port means 15 and a MCPU port means 13. Each of the port means 9, 11, 13 and 15 can separately read and write information from and to the memory means 7.

A workstation connected to the LAN packet channel bus, through an operating LAN, sends information or data to the switch module 1. This information is received by the LAN connector 5 and sent to the memory means 7 through the LAN port means 9. Processing is performed on the information between the LAN connector 5 and the LAN port means 9 by a LAN interface means 19 in order to place the information in a packet format to be stored in a memory.

While the information is in the memory means 7, it is analyzed and modified into an ATM format. The ATM network is also configured by the switch module 1 to receive this information. The information is then transferred out of the memory means 7 through the ATM port means 11 and to the ATM line through an ATM interface means 17 and the ATM connector 3.

Likewise a workstation sending information from the ATM line, sends the information to the ATM connector 3 in the ATM format. This information is processed by the ATM interface means 17 for storage in the memory means 7. A switch processor or processors reads the information, modifies the information for delivery to the LAN packet channel bus, and configures the LAN packet channel bus to receive the information. The switch module then transfers the information out of the memory 7, through the LAN port means 9, through the LAN interface means 19 to further configure the information for the LAN packet channel bus, and the information is then sent to the LAN packet channel bus through the LAN connector 5.

By having two separate and distinct ports on the memory 7, the writing of data by the ATM interface means 17 to the memory 7, does not effect any reading or writing of information from the LAN interface means 19 to the LAN connector and LAN packet channel bus. Likewise, the LAN interface means 19 writing to the memory 7 does not prevent the ATM interface means 17 from reading or writing to the ATM connector 3. The two separate and distinct ports on the memory 7 can thus allow a substantially simultaneous two way transfer of information between the ATM and the LAN.

Figure 2A:
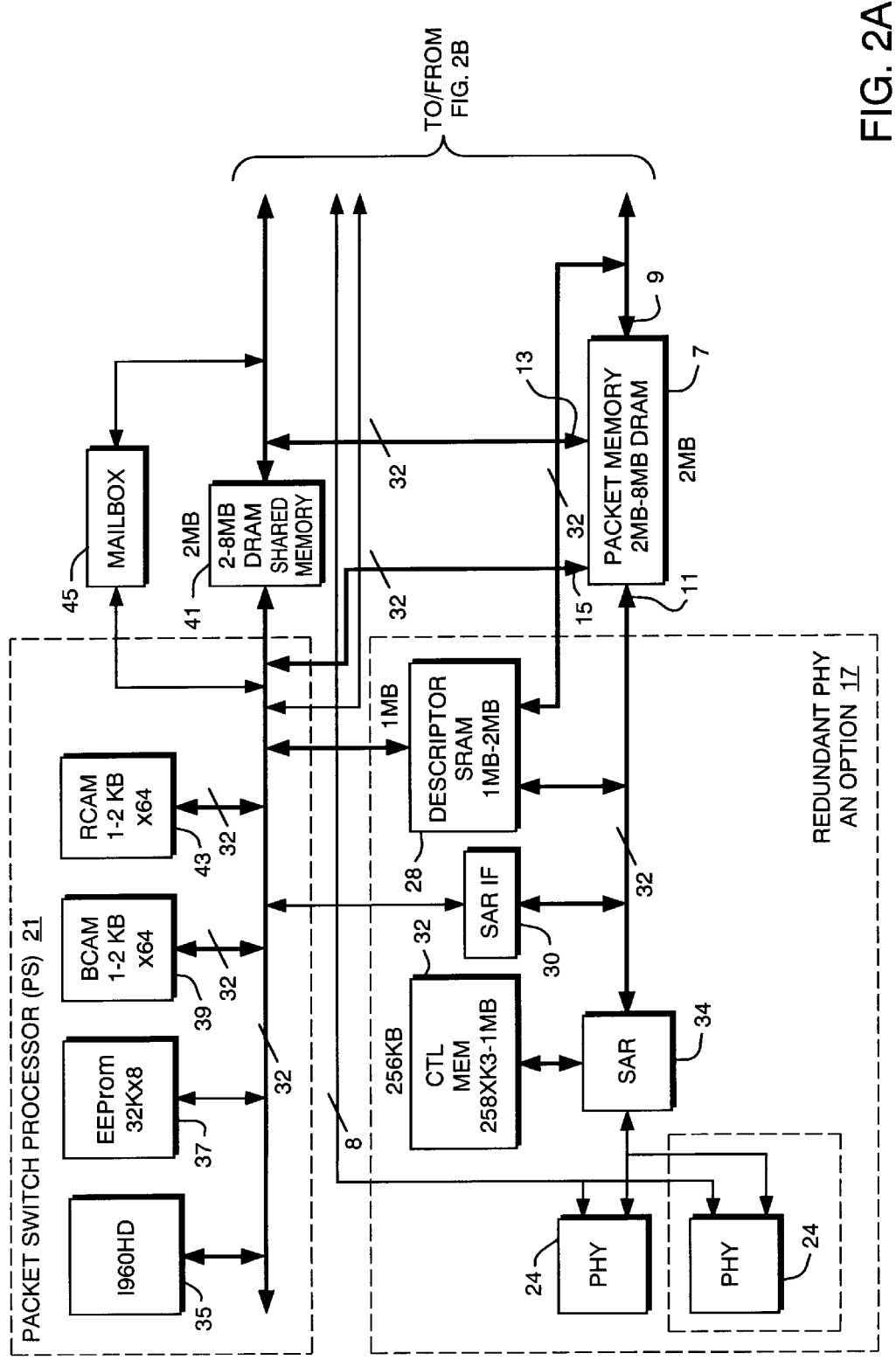
FIG. 2, is a schematic diagram of the processors inside the switch module.
Figure 2B:
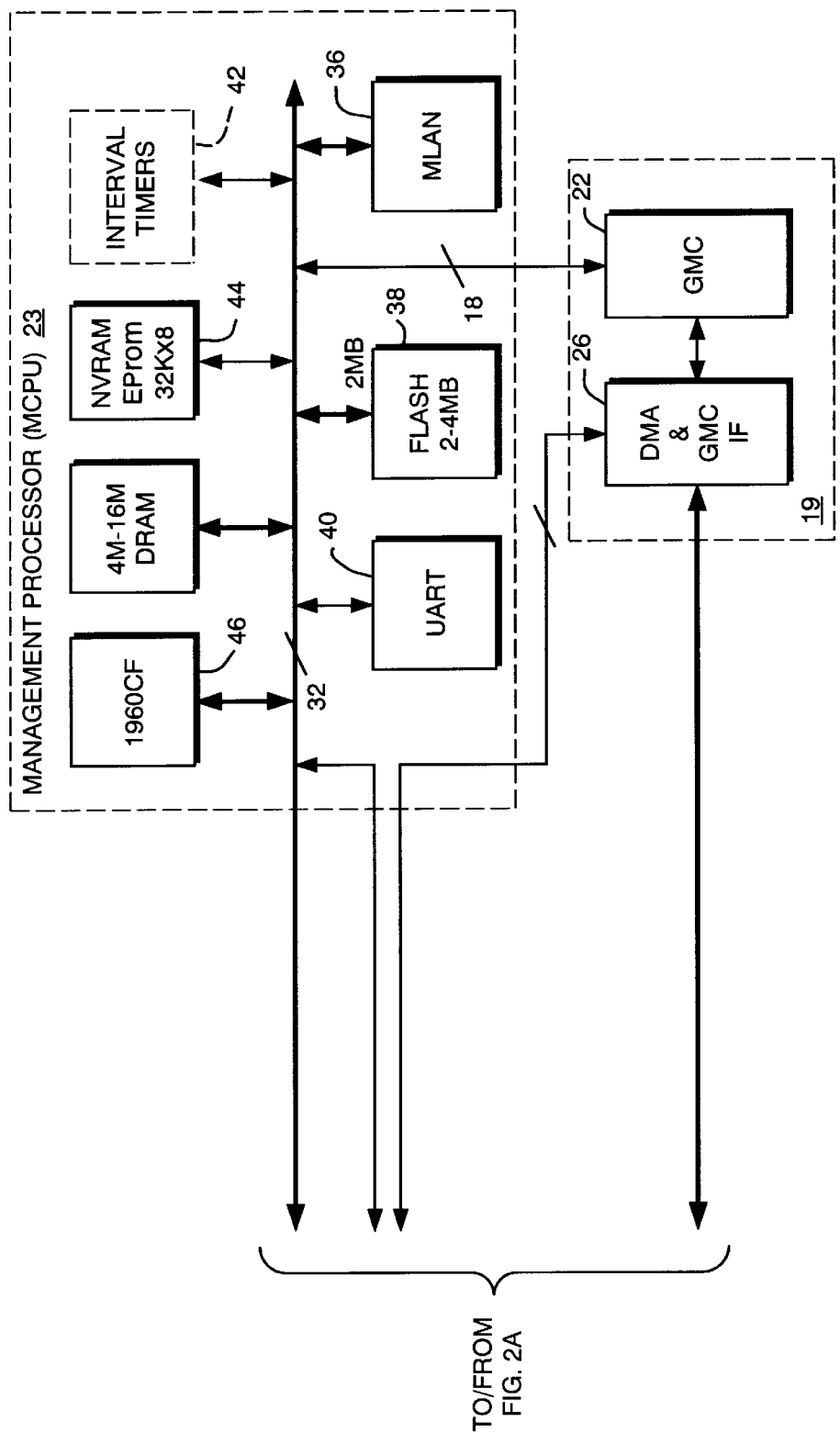

The switch module 1 also includes a packet switching processor (PSP) 21 and a management central processor unit (MCPU) 23. FIG. 2 shows an expanded view of the packet switch processor 21, the management processor 23, the ATM interface means 17 and the LAN interface means 19.

The PSP 21 includes the following function blocks:

1. A high speed Reduced Instruction Set (RISC) processor 35 model number i960HD.

2. An EEProm (Electrically Erasable Programmable Read Only Memory) 37, which is a small amount of non-volatile memory that is used when the board powers up to configure the i960HD processor 35.

3. BCAM 39, this is a CAM which is used to cache the address table lookups, which is part of the forwarding functions. The destination address in the packet is used to lookup in the CAM to determine if it is in the CAM (has been previously cached in the CAM); if it has, then an index is returned which is used to look up the actually forwarding information in the Shared Memory 41.

4. RCAM 43: This is a routing CAM, with a connector on the board routing functions.

5. Shared Memory (SM) 41: The shared memory 41 is a dual ported memory between the MCPU 23 and the PSP 21. The PSP 21 uses the SM 41 for it's instruction memory, and for storing forwarding tables that were setup by the MCPU 23. Note: that in the BCAM 39, the shared memory 41 is used in the forwarding lookup. If the lookup misses in the CAM then the PSP 21 will do a binary search in the SM 41 to find the forwarding information. The shared memory 41 is actually held in common with the MCPU 23.

6. Mailbox 45: The mailbox 45 is a mechanism between the PSP 21 and MCPU 23 which both processors can use to interrupt the other, and is held in common.

The MCPU 23 includes:

1. A high speed RISC processor 46 model number i960CF.

2. EProm (Electrically Erasable Programmable Read Only Memory) 44, this is a small amount of non-volatile memory that is used when the board powers up to configure the i960CF processor 46.

3. Share Memory 41 (SM): The shared memory 41 is a dual ported memory between the MCPU 23 and PSP 21. The MCPU 23 uses the SM 41 to setup forwarding tables that are used be the PSP 21. The shared memory 41 is actually held in common with the MCPU 23.

4. Mailbox 45: The mailbox 45 is a mechanism between the PSP 21 and MCPU 23 which both processors can use to interrupt the other, and is held in common.

5. Interval Timers 42: The interval timers 42 are used to generate periodic interrupts to the MCPU 23.

6. UART 40: A serial port interface to connect to a terminal, used for software debug.

7. FLASH 38: This is a non-volatile memory used to store MCPU programs and other information that must be saved when power is lost.

8. MLAN 36: This is a management LAN interface for managing the Ethernet LAN on the Hub's backplane to which the board must interface to.

The ATM interface means 17 in FIG. 2 includes:

1. An SAR 34, (Segmentation and Reassembly) which performs translation between a LAN packet and an ATM cell or cells, and does the actual transfer of data to/from the ATM port. The translation includes either segmenting a LAN packet into 48 byte ATM cells and appending the ATM cell Header, or includes reassembling cells into a LAN packet and stripping off the ATM cell header.

2. A CTL MEM (Control Memory) 32: The SAR 34 requires a small amount of external control memory which it uses to store ATM address tables and intermediate data used in segmentation and reassembly process.

3. A SAR IF 30: This block is an interface to the PSP 21, which is require so that the PSP 21 can read and write registers inside the SAR 34. The SAR IF 30 is required to initially configure the SAR 34 and occasionally during normal operation to initiate a packet transfer.

4. Descriptor Memory (DM) 28 is a 3 ported memory the contains information for the SAR 34 and DMA 26 sections on packets to be transferred (forwarded). The PSP 21 sets up these descriptors and the SAR 34 and DMA 26 operate on these descriptors.

5. PHY block 24 is a physical layer interface, which is a daughtercard that plugs on to the LAN to ATM Backbone Switchmodule. This PHY block 24 takes individual cells from the SAR block 34 and packs them in to SONET (Synchronous Optical NETwork) frames, serializes this data, and finally converts this serial data to optical signals for transmission. Many ATM cells are packed into SONET frames along with some overhead information which provides some error detection mechanisms. The PHY module or block 24 will simultaneously receive an optical bit stream of data, convert it to an electrical bit stream, unpack the SONET frames and sent individual cells to the SAR 34 for reassembly.

The LAN interface means 19 includes in FIG. 2:

1. A DMA & GMC IF module or block 26, which is responsible for reading the descriptor memory 28, and performing requested transfer of packets to/from the GMC module 24.

2. The GMC module 22 is the Packetchannel interface, and will arbitrate for the LAN Packetchannel bus to transfer packets, and will accept packets directed to it.

Figure 3:
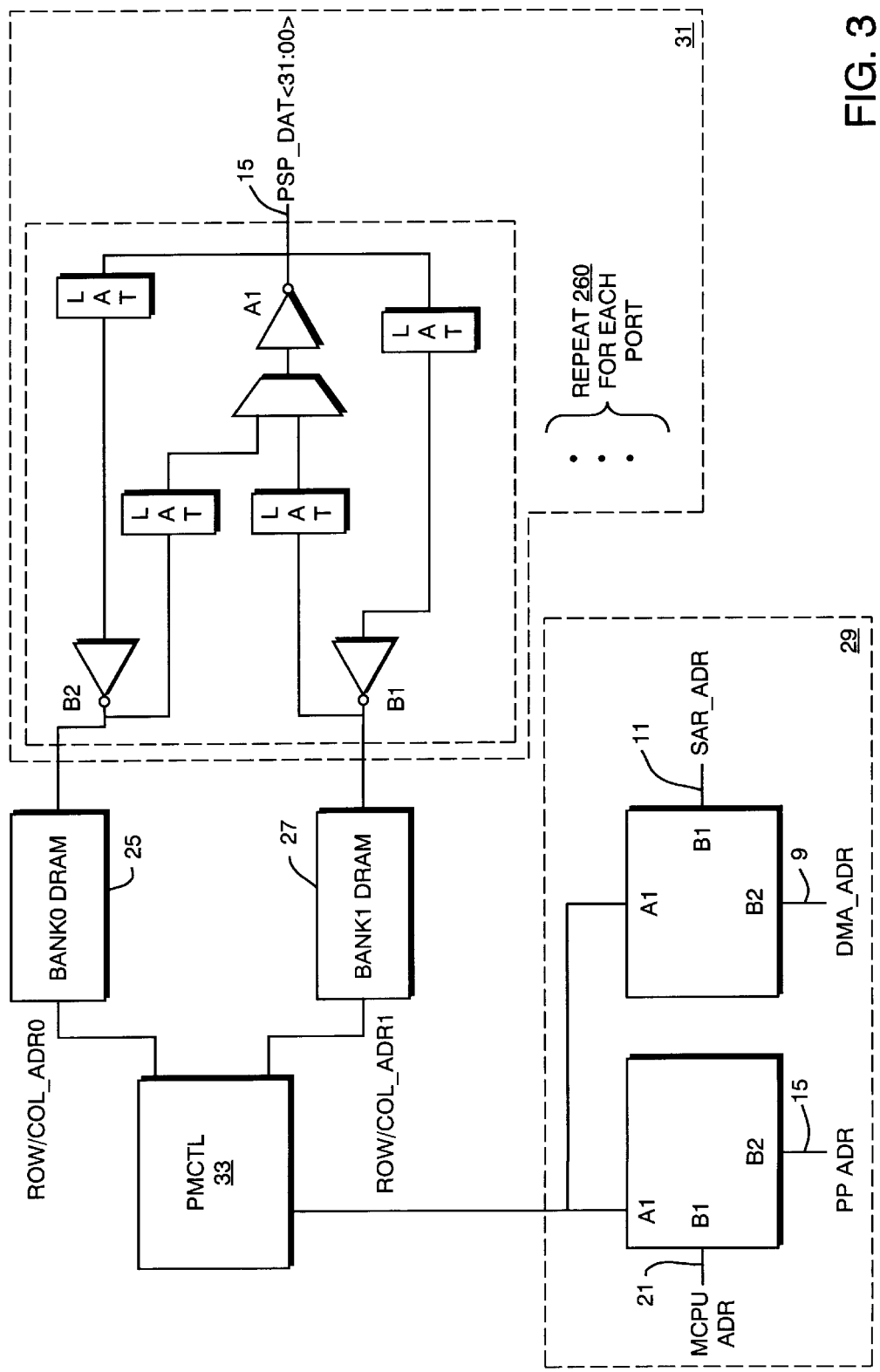
FIG. 3, is a schematic view of the memory means of the present invention.

A detailed schematic view of the memory 7 is shown in FIG. 3. The memory in the switch module 1 is preferably a four ported DRAM memory design, intended for the fast layer switching of packets to/from the ATM connection 3 and the LAN connector 5. Each port means to the interleaved DRAM is buffered to allow each port to execute concurrent operation to their other memory resources. The normal high speed flow of data is to/from the ATM and LAN. The management process has its own port allowing the creation of management packets which can be transmitted to the ATM and the LAN. The packet switching processor 21 can look directly at packet headers in the memory 7 for fast forwarding decisions. All of the memory ports are substantially the same speed with each port being able to accommodate different word lengths. The four ports of the present invention allow for concurrent operation for the four processors at each port means. Note that the ATM interface means 17 and the LAN interface 19 can be considered special purpose processors. The concurrent operation of all these processors increases performance.

As it is highlighted in the block diagram of FIG. 2, the memory 7 is central to the design of the switch module 1. All information or packets from the networks must flow through the memory 7 and the fact that each of the four processors, 17, 19, 21 and 23 have their own port means, allows these processors or entities to operate concurrently provided they are not reading or writing to the same memory location at the same time.

FIG. 3 shows the interleaved DRAM with bank 0 DRAM 25 and bank 1 DRAM 27. An address path 29 and data paths 31 of the ports are divided to show how they interact with bank 0 and 1. All the address portions of the port means are shown in FIG. 3, while only the data portion of PSP port means 15 is shown. The data portions of the other port means are connected to bank 0 and bank 1 in the same manner.

The PMCTL 33 (Packet Memory ConTLer), controls both the address path 29 and the data paths 31 in the memory means 7. The PMCTL 33 performs all the arbitration functions for the 4 ports, and all the control functions for the DRAM 25,27.

The address path 29 latches the address requested for all four ports, and under the direction of the PMCTL 33 will direct the winner of the arbitration's address to the PMCTL 33. The PMCTL will take that address and generated the appropriate row and column addresses.

The DRAMs 25, 27 are configured as two interleaved memories, each 32 bits (4 bytes) wide. The interleaving allows for multiple fetching (bursting) of words in contiguous memory addresses, where the data is read/written alternating between each bank. This enables bursting a 32 bit word every cycle; if the memory were not interleaved it would not be fast enough to do this.

The Data path 31, again under the PMCTL's 33 control, will latch read or write data, depending on the request transfer, and perform either a write to or a read from the DRAM.

Each bank 25, 27 is preferably a 1–32 bit wide SIMM module populated with 60 ns DRAMS. The size of each RSIMM module is flexible allowing for a variety of configurations. Possible memory configurations can be:

| SIMM SIZE | MEMORY SIZE |
| --- | --- |
| 256K × 32 | 2 MB |
| | (Not valid for MCPU DRAM) |
| 512K × 32 | 4 MB |
| 1M × 32 | 8 MB |
| 2M × 32 | 16 MB |

Figure 4:
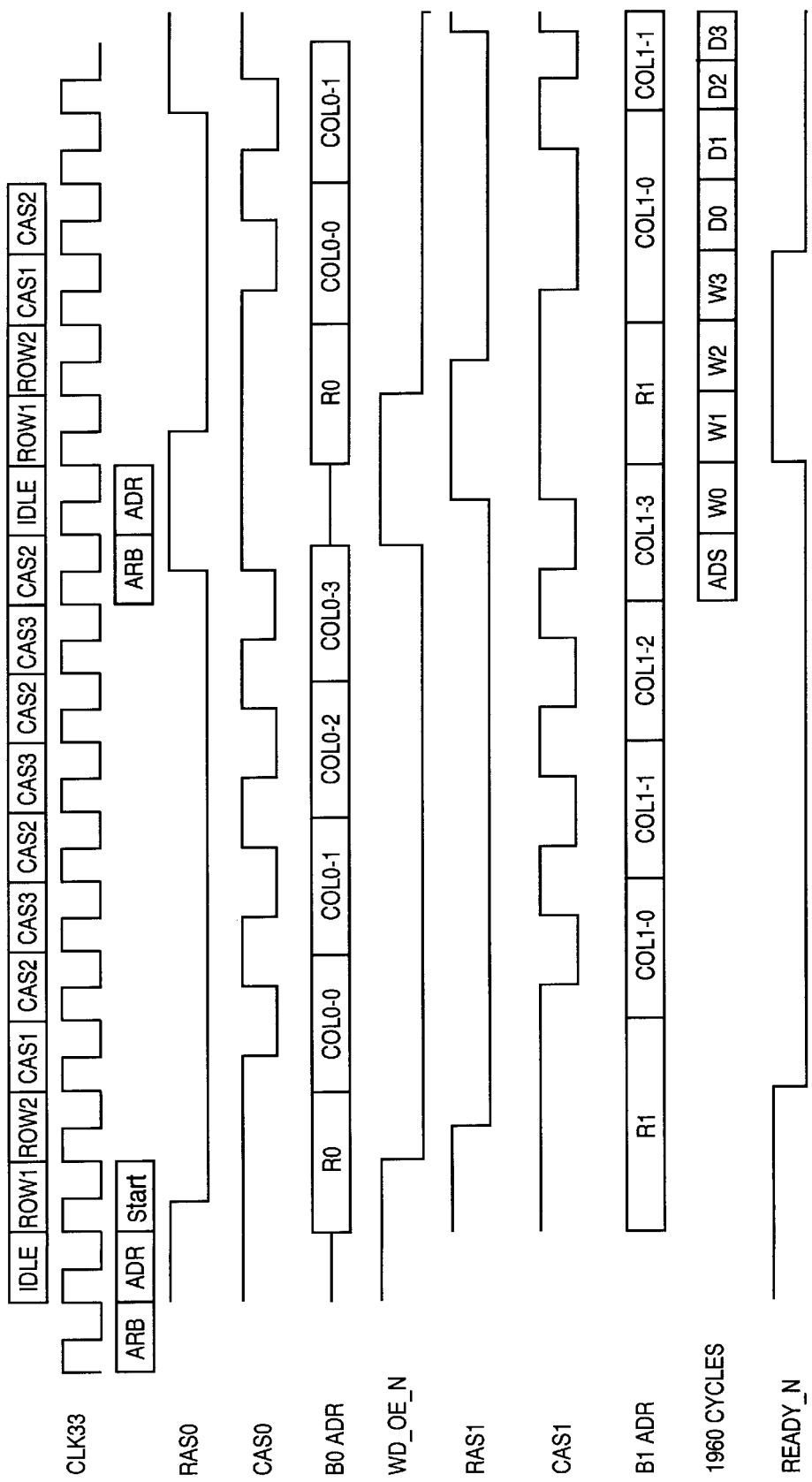
FIG. 4, is a timing diagram for the reading of the memory means.
Figure 5:
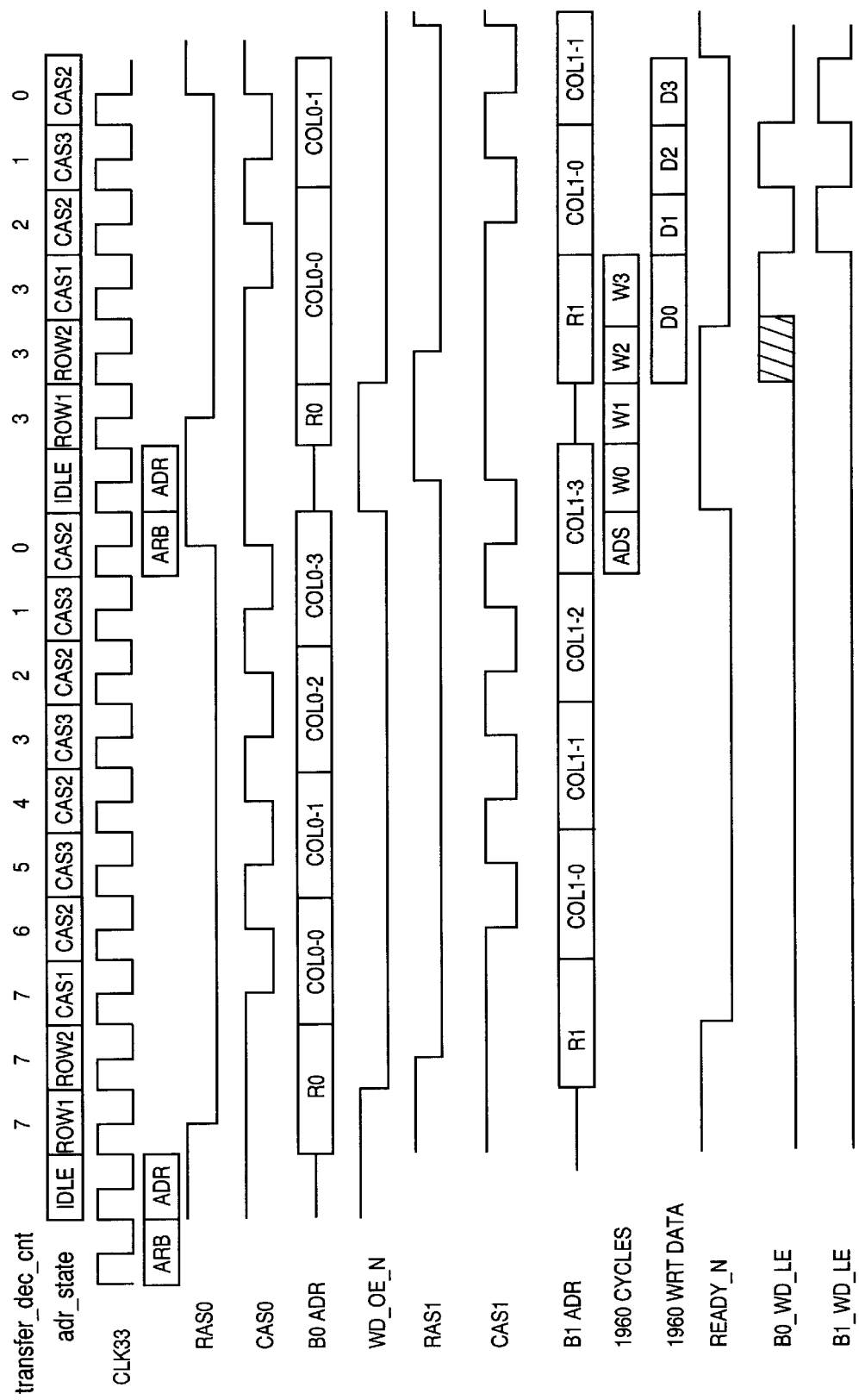
FIG. 5, is a timing diagram for the writing of the memory means.

FIGS. 4 & 5 show the timing diagram for reading the memory 7 and illustrates the timing relationships. As illustrated, the arbitration cycle takes place while an access is currently taking place. FIGS. 4 & 5 illustrate the timing of control signals going to the DRAM 25, 27 and the requested port. DRAMs 25, 27 require that an address be broken up into a row address and column address, with a corresponding address strobe for each: RAS and CAS.

At the top of the timing diagram are boxes with labels: idle, row1, row2, cas1, cas2, cas3. This refers to a state machine that is internal to the PMCTL. Some of the other signals shown in FIG. 4 are some of the data path signals. The Ready_N signal is one of four ready signals that go back to each port to indicate that the request data is ready (for reads), or for writes that the next write data word should be driven.

The memory means 7 includes an arbitration means to determine which port means 9, 11, 13 or 15 has first priority to the information or packets contained in the memory, should there be a simultaneous read/write request. If the packet switching processor 21 has a request, it is always given priority. The priority of the remaining port means, 9, 11, 13 is determined in a round robin manner. The arbitration means includes a three bit state machine that will transition whenever one of the three ports is granted a request to the memory, on the rising edge of the clock.

| STATE | Priority | State Name |
| --- | --- | --- |
| 000 | Unused | |
| 001 | MCPU, DMA, SAR | MDS |
| 011 | MCPU, SAR, DMA | MSD |
| 010 | DMA, MCPU, SAR | DMS |
| 110 | DMA, SAR, MCPU | DSM |
| 101 | SAR, MCPU, DMA | SMD |
| 100 | SAR, DMA, MCPU | SDM |
| 111 | unused | |

The state transition depends on the current state and the active requests whenever there are simultaneous requests. For example:

| Current State | Grant | Next State |
| --- | --- | --- |
| MDS | DMA | MSD |
| MDS | MCPU | DSM |
| MDS | SAR | MDS |
| DMS | MCPU | DSM |
| DMS | DMA | MSD |
| DMS | SAR | DMS |
| etc. | | |

For instance, each state 001–100 has a particular order for the priority of the three port means. When the arbitration means is in a particular state, such as state 001 having the name MDS, and a DMA and SAR request is received, the DMA request is granted. The arbitration state machine then goes to state MSD, 011 where the DMA is given lowest priority.

The arbitration logic needs to be closely tied to the port controls logic because a grant needs to be granted in the same cycle as a request if the DRAM controller is either idle or within two cycles of the end of a request. The arbitration logic will need to look at the round robin priority, the DRAM controller state, the individual port request and the latched version of a port request in order to determine who wins the next cycle.

The arbitration logic will control the address data path as defined in the following chart:

| ADR_SEL & ADR_ENB<1:0> | DataPath Enabled |
| --- | --- |
| 000 | unused1 |
| 001 | SAR |
| 010 | PSP |
| 011 | ADP_IDLE |
| 100 | unused2 |
| 101 | DMA |
| 110 | MCPU |
| 111 | Unused3 |

While specific embodiments of the invention have been shown and described in detail to illustrate the application of the principles of the invention, it will be understood that the invention may be embodied otherwise without departing from such principles.

What is claimed is:

1. A LAN to ATM switchmodule comprising:

memory means for storing information, said memory means including ATM port means, LAN port means and processor port means for each separately reading and writing the information in said memory means, said processor port means of said memory means includes PSP port means and MCPU (Management and Control Processor Unit) port means for each separately reading and writing the information in said memory means;

ATM interface means for reading the information from said ATM port means and converting the information into ATM format, said ATM interface means also converting ATM format information and delivering the converted ATM format information to said ATM port means to be written to said memory means;

LAN interface means for reading the information from said LAN port means and converting the information into LAN format, said LAN interface means also converting LAN format information and delivering the converted LAN format information to said LAN port means to be written to said memory means;

processor means for reading the information in said memory means though said processor port means, determining processing needed for the information, modifying the information in said memory means according to the processing needed by writing to said memory means through said processor port, and controlling said ATM and LAN interface means according to the processing needed, said processor means includes packet switching processor (PSP) means for reading the information in the memory means through said PSP port means, determining a destination of said information and modifying a header portion of said information through said PSP port means, said processor means also including management and control processor means for reading the information in the memory means through said MCPU port means, determining proper configuration of the ATM and LAN, and writing information to said memory means through said MCPU port to configure the ATM and LAN.

2. A switchmodule in accordance with claim 1, wherein:
said memory means includes a plurality of memory units, said processor means individually analyzes each of said memory units.

3. A switchmodule in accordance with claim 1, wherein:
said port means are substantially equal in speed.

4. A switchmodule in accordance with claim 1, wherein:
said port means have different word lengths.

5. A switchmodule in accordance with claim 1, wherein:
said ATM interface means includes an ATM connection for transmitting and receiving ATM information over an ATM line, and includes segmentation and reassembly means for converting the information between fixed lengths of the ATM information and variable lengths of LAN information.

6. A switchmodule in accordance with claim 1, wherein:
said memory means includes arbitration means for giving priority to one of said port means according to a predetermined logic.

7. A switchmodule in accordance with claim 6, wherein:
said predetermined logic includes always giving first priority to said PSP port means, and determines priority of remaining port means by a round robin pattern.

8. A LAN to ATM switchmodule comprising:
memory means for storing information, said memory means including ATM port means, LAN port means and processor port means for each separately reading and writing the information in said memory means, said memory means includes arbitration means for always giving first priority to said processor port means, and determines priority of remaining said port means by a round robin pattern;

ATM interface means for reading the information from said ATM port means and converting the information into ATM format, said ATM interface means also converting ATM format information and delivering the converted ATM format information to said ATM port means to be written to said memory means;

LAN interface means for reading the information from said LAN port means and converting the information into LAN format, said LAN interface means also converting LAN format information and delivering the converted LAN format information to said LAN port means to be written to said memory mean;

processor means for reading the information in said memory means though said processor port means, determining processing needed for the information, modifying the information in said memory means according to the processing needed by writing to said memory means through said processor port, and controlling said ATM and LAN interface means according to the processing needed.

9. A switchmodule in accordance with claim 8, wherein:
said memory means includes a plurality of memory units, said processor means individually analyzes each of said memory units.

10. A switchmodule in accordance with claim 8, wherein:
said port means are substantially equal in speed.

11. A switchmodule in accordance with claim 8, wherein:
said port means have different word lengths.

12. A switchmodule in accordance with claim 8, wherein:
said ATM interface means includes an ATM connection for transmitting and receiving ATM information over an ATM line, and includes segmentation and reassembly means for converting the information between fixed lengths of the ATM information and variable lengths of LAN information.

13. A LAN to ATM switchmodule comprising:
memory means for storing information, said memory means including ATM port means, LAN port means and processor port means for each separately reading and writing the information in said memory means;

ATM interface means for reading the information from said ATM port means and converting the information into ATM format, said ATM interface means also converting ATM format information and delivering the converted ATM format information to said ATM port means to be written to said memory means;

LAN interface means for reading the information from said LAN port means and converting the information into LAN format, said LAN interface means also converting LAN format information and delivering the converted LAN format information to said LAN port means to be written to said memory means;

processor means for reading the information in said memory means though said processor port means, determining processing needed for the information, modifying the information in said memory means according to the processing needed by writing to said memory means through said processor port, and controlling said ATM and LAN interface means according to the processing needed, said processor means includes packet switching processor (PSP) means for reading the information in the memory means through said processor port means, determining a destination of said information and modifying a header portion of said information through said processor port means.

14. A switchmodule in accordance with claim 1, wherein:
said memory means includes arbitration means for giving priority to one of said port means according to a predetermined logic.

15. A switchmodule in accordance with claim 13, wherein:
said memory means includes a plurality of memory units, said processor means individually analyzes each of said memory units.

16. A switchmodule in accordance with claim 13, wherein:
said port means are substantially equal in speed.

17. A switchmodule in accordance with claim 13, wherein:

said port means have different word lengths.

18. A switchmodule in accordance with claim 13, wherein:

said ATM interface means includes an ATM connection for transmitting and receiving ATM information over an ATM line, and includes segmentation and reassembly means for converting the information between fixed lengths of the ATM information and variable lengths of LAN information.

19. A switchmodule in accordance with claim 13, wherein:

said memory means includes arbitration means for giving priority to one of said port means according to a predetermined logic.

20. A switchmodule in accordance with claim 19, wherein:

said predetermined logic includes always giving first priority to said PSP port means, and determines priority of remaining port means by a round robin pattern.

* * * * *